US012709352B2

(12) United States Patent
Shaller

(10) Patent No.: US 12,709,352 B2
(45) Date of Patent: Aug. 18, 2026

(54) REMOVABLE TRAY ASSEMBLY FOR STATIONARY BIKE

(71) Applicant: Foothill Products, LLC, Austin, TX (US)

(72) Inventor: Douglas Shaller, Austin, TX (US)

(73) Assignee: Foothill Products, LLC, Austin, TX (US)

( * ) Notice: Subject to any disclaimer, the term of this patent is extended or adjusted under 35 U.S.C. 154(b) by 0 days.

(21) Appl. No.: 18/805,471

(22) Filed: Aug. 14, 2024

(65) Prior Publication Data

US 2024/0400151 A1 Dec. 5, 2024

Related U.S. Application Data

(63) Continuation of application No. 17/866,187, filed on Jul. 15, 2022, now Pat. No. 12,091,125.

(60) Provisional application No. 63/290,188, filed on Dec. 16, 2021.

(51) Int. Cl.
*B62K 19/40* (2006.01)

(52) U.S. Cl.
CPC .................................... *B62K 19/40* (2013.01)

(58) Field of Classification Search
CPC .......... B62K 21/125; B62K 19/40; B62J 7/06; B62J 9/21; B62J 9/27; B62J 11/00; B62J 45/20
See application file for complete search history.

(56) References Cited

U.S. PATENT DOCUMENTS

| | | |
|---|---|---|
| 4,756,454 A | 7/1988 | Villanueva et al. |
| 4,828,151 A | 5/1989 | Goss |
| 5,005,661 A | 4/1991 | Taylor et al. |
| 8,998,048 B1 | 4/2015 | Wu |
| 9,357,044 B1 | 5/2016 | Scully et al. |
| 2007/0069101 A1 | 3/2007 | Shevin-sandy |
| 2013/0307470 A1 | 11/2013 | Watanabe et al. |
| 2014/0061271 A1 | 3/2014 | Tate |
| 2019/0154190 A1 | 5/2019 | Yun |
| 2020/0207434 A1 | 7/2020 | Lin |
| 2021/0188380 A1 | 6/2021 | Whitten et al. |

(Continued)

FOREIGN PATENT DOCUMENTS

| | | |
|---|---|---|
| BR | 102018006319 A2 | 10/2019 |
| CN | 103786814 A | 5/2014 |

(Continued)

OTHER PUBLICATIONS

Machine Translation of the Description of BR 102018006319 A2, (Oct. 15, 2019).

(Continued)

*Primary Examiner* — Daniel D Yabut

(74) *Attorney, Agent, or Firm* — Schwegman Lundberg & Woessner, P.A.

(57) ABSTRACT

An ergonomic device to provide a removable tray assembly to be attached to a bicycle via one or more means is described, wherein the removable tray assembly may comprise: a tray; an interface element that attaches the tray to a mount via a locking mechanism, such as a quarter turn locking mechanism, wherein the mount comprises a clamping mechanism to attach the mount to the bicycle. According to certain embodiments, the tray may be configured for attachment to a handlebar of a bicycle, such as a stationary bicycle, to provide a platform to hold or place one or more objects.

20 Claims, 16 Drawing Sheets

(56) References Cited

U.S. PATENT DOCUMENTS

| | | | |
|---|---|---|---|
| 2021/0249880 | A1 | 8/2021 | Taylor et al. |
| 2022/0142336 | A1 | 5/2022 | Fang |
| 2023/0192225 | A1 | 6/2023 | Shaller |

FOREIGN PATENT DOCUMENTS

| | | | |
|---|---|---|---|
| DE | 202016101119 | U1 | 3/2016 |
| FR | 2868034 | A1 | 9/2005 |
| KR | 20140020525 | A | 2/2014 |
| KR | 101559361 | B1 | 10/2015 |
| KR | 20200065697 | A | 6/2020 |
| WO | WO-2019174639 | A1 | 9/2019 |

OTHER PUBLICATIONS

U.S. Appl. No. 17/866,187, Non Final Office Action mailed Jan. 19, 2024, 14 pgs.

U.S. Appl. No. 17/866,187, Notice of Allowance mailed May 15, 2024, 7 pgs.

U.S. Appl. No. 17/866,187, Response filed Apr. 19, 2024 to Non Final Office Action mailed Jan. 19, 2024, 8 pgs.

REMOVABLE TRAY ASSEMBLY FOR STATIONARY BIKE

RELATED APPLICATIONS

This application is a continuation of and claims the benefit of priority under 35 U.S.C. § 120 to U.S. patent application Ser. No. 17/866,187, filed on Jul. 15, 2022, which claims the benefit of priority under 35 U.S.C. § 119(e) to U.S. Provisional Patent Application Ser. No. 63/290,188, filed on Dec. 16, 2021, each of which is incorporated by reference herein in its entirety.

TECHNICAL FIELD

The present invention relates to the field of ergonometric devices and to the means for providing access to computing equipment while actively using exercise equipment.

BACKGROUND

Exercising indoors has become a regular part of many people's lives. People riding bicycles in a stationary manner may use a smart phone or other connected devices to help aid in exercise. Often a person will need a quick and accessible place to store a smartphone, remote or other devices. People often use the same bicycle for both outdoors and for stationary training. An invention is needed that easily attaches to a bicycle using existing mounts, such as a cycling computer mount that utilizes quarter turn locking. For example, a Global Positioning System (GPS) computer mount typically use a quarter turn interface to lock a device in place.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
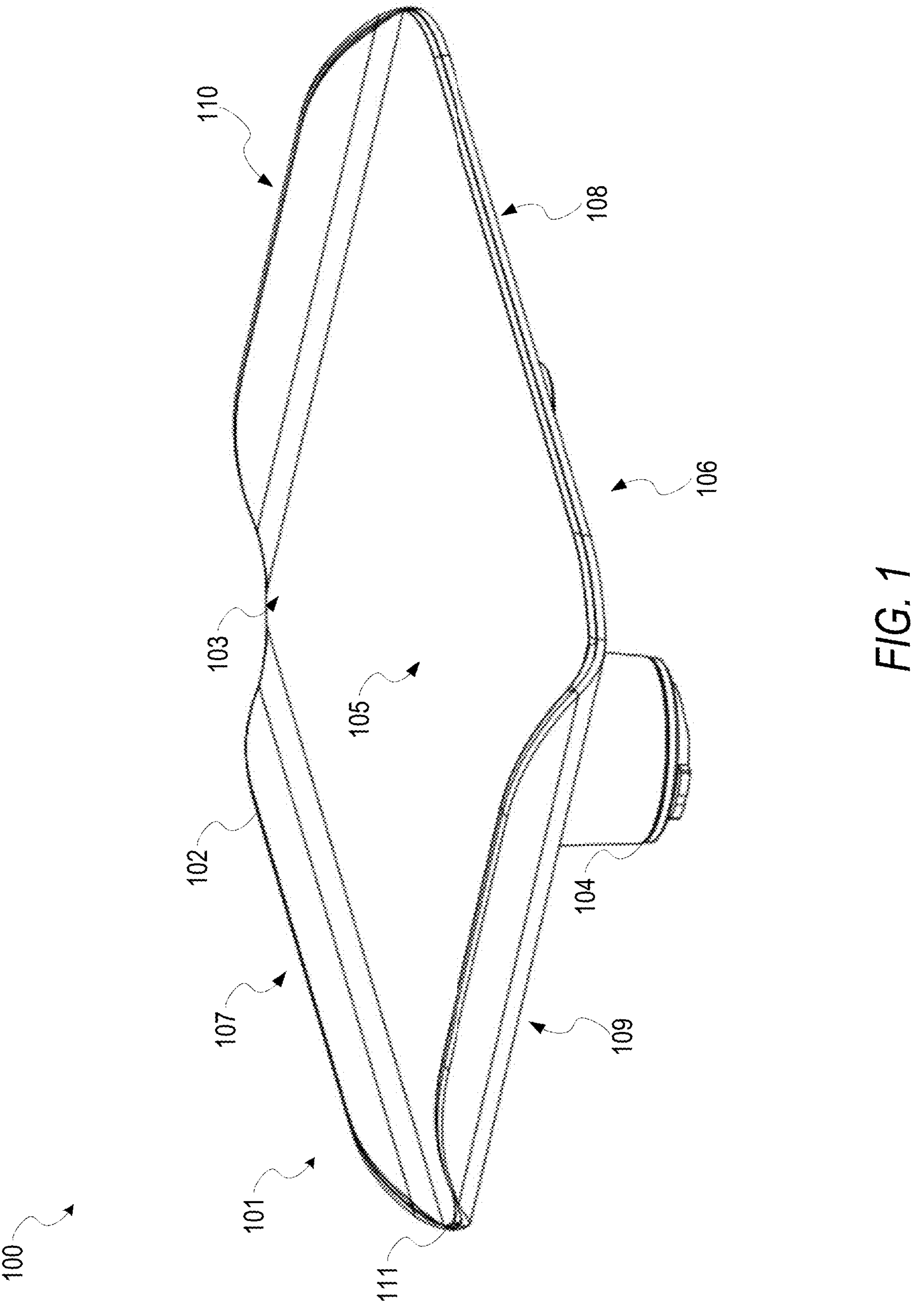
FIG. 1 includes a diagram depicting a removable tray assembly that includes a tray that comprises a reverse crowned surface and an interface element, according to certain embodiments.

An ergonomic device to provide a removable tray assembly to be attached to a bicycle via one or more means is described, wherein the removable tray assembly may comprise: a tray; an interface element that attaches the tray to a mount via a locking mechanism, such as a quarter turn locking mechanism, wherein the mount comprises a clamping mechanism to attach the mount to the bicycle. According to certain embodiments, the tray may be configured for attachment to a handlebar of a bicycle, such as a stationary bicycle, to provide a platform to hold or place one or more objects such as a mobile device, keyboard, book, snacks, and the like.

In some embodiments, the tray may comprise a substantially planar surface comprising a retaining portion, wherein the retaining portion may be recessed into a portion of the substantially planar surface. The tray may include one or more features that include: a non-slip pad which may be applied to the substantially planar surface of the tray to provide additional grip and vibration dampening; an inductive charging plate which may be integrated into the substantially planar surface of the tray; and an accessory mount configured to removably attach one or more accessory elements to the tray.

In some embodiments, the locking mechanism of the interface element of the tray may include a quarter turn locking mechanism, which may be utilized to attach a cycling Global Positioning System (GPS) to a bicycle. In such embodiments, the interface element may be integrated into the tray, such that the tray and interface element are manufactured as, or assembled into a single unified piece, while in further embodiments, the interface element may be removably attached to the tray, such as via one or more mounting holes, a strap, hook-and-loop fasteners, a threaded receiver, twist-lock, as well as a quarter turn locking mechanism.

In some embodiments, the interface element to attach the tray to the quarter turn locking mechanism of the bicycle may include a rotating assembly. The rotating assembly may be integrated into the interface element of the tray, or in further embodiments may be a separate and distinct component. For example, the rotating assembly may be attached to the removable tray assembly by a quarter turn locking mechanism, or other means.

In some embodiments, the tray may comprise a top side, a bottom side, a rear side, a front side, a left side, and a right side. For example, the tray may comprise a rectangular or square shape, wherein corners of the tray are rounded.

In some embodiments, the tray may comprise a reverse crowned surface, wherein one or more of the rear side, the front side, the left side, and the right side are upturned to form the reverse crowned surface.

In some embodiments, the top side of the tray may comprise a planar surface, and the reverse crowned surface may be formed of a removable rim component affixed to the top side of the tray. For example, the removable rim component may comprise a set of mounting holes which may align with a corresponding set of mounting holes dispersed upon the top side of the tray. Accordingly, the removable rim component may be affixed to the top side of the tray by one or more pins or screws.

In some embodiments, the locking mechanism may include a twist lock locking mechanism, or quarter turn locking mechanism. For example, the mount assembly may comprise a first end that comprises a female coupling, and the interface element may comprise a corresponding end that comprises a male coupling, such that the male coupling may be inserted into the female coupling of the mount assembly and rotated in order to lock the tray to the mount assembly.

In some embodiments, the interface element may be affixed to the bottom side of the tray by one or more mounting pins or screws and may comprise a protrusion that includes a male coupling configured to lock into a female coupling of the mount assembly. For example, the protrusion may comprise a cylindrical body.

In some embodiments, the ergonomic device may further comprise a riser element that comprises a first end and a second end, wherein a first end of the riser element comprises a female coupling to receive the male coupling of the interface element, and wherein a second end of the riser element may comprise a male coupling to be inserted into the female coupling of the mount assembly.

In some embodiments, the riser element may comprise a cylindrical body that includes one or more tab elements protruding horizontally from the cylindrical body of the riser element. Accordingly, the tabs may be used to twist the riser element in order to lock the riser element in place, affixing the tray and interface element to the mount assembly.

In some embodiments, the ergonomic device may further comprise an inductive charging plate. For example, the inductive charging plate may be mounted upon a bottom side of the tray, such that a device, such as a mobile device, placed upon the top side of the tray may be charged using the inductive charging plate. In some embodiments, the inductive charging plate may be integrated into the interface element of the ergonomic device, wherein the interface element is affixed to the bottom side of the tray, thereby providing an inductive surface to the ergonomic device.

In some embodiments, the ergonomic device may further comprise an elastic strap element affixed above the top side of the tray and disposed between the left side and the right side of the tray. For example, the elastic strap element may comprise a first end and a second end, wherein the first end and the second end are bonded to the top surface of the tray.

In some embodiments, the ergonomic device may further comprise a non-slip pad, such as a foam pad, applied upon the top side of the tray. In some embodiments the non-slip pad may be bonded to a surface of the top side of the tray. In some embodiments, the non-slip pad may be affixed to the top side of the tray by one or more retention pins or screws.

In some embodiments, the ergonomic device may further comprise a drip guard formed of a transparent material that comprises a planar surface, and a projection element configured to attach the drip guard to the tray. For example, the projection element may comprise a set of mounting holes that align with a corresponding set of holes dispersed along the bottom side of the tray. In some embodiments, the corresponding set of holes may be disposed upon the interface element mounted upon the bottom side of the tray, such that the drip guard may be affixed to the interface element, and held in place above the top side of the tray by the projection element.

In some embodiments, the ergonomic device may further comprise a raised board element mounted proximate to the rear side of the tray and extending upwards to form a backboard. The raised board may comprise a mounting surface that comprises a set of holes that align with a corresponding set of holes dispersed along the bottom side of the tray. For example, the corresponding set of holes may be disposed upon the interface element mounted upon the bottom side of the tray, such that the raised board may be affixed to the interface element and held in place proximate to the rear side of the tray by the mounting surface.

FIG. 1 includes a diagram 100 depicting an ergonomic device 101 that comprises a tray 102 that comprises a reverse crowned surface 103, and an interface element, according to certain embodiments.

As seen in the diagram 100, the tray 102 may comprise a top side 105, a bottom side 106, a front side 107, a back side 108, a right side 109, and a left side 110. In some embodiments, the tray 102 may further comprise a non-slip pad 111 affixed upon the top side 105. For example, the non-slip pad 111 may include a foam or rubber pad, wherein the non-slip pad 111 is bonded or affixed to the top side 105 by one or more of a set of pins, screws, or adhesive.

According to certain embodiments, the interface element 104 may comprise a first end and a second end, wherein the first end is configured to affix the interface element 104 to the bottom side 106 of the tray 102, and wherein the second end comprises a twist-lock mechanism, such as a quarter turn mechanism, configured to interface with a mount assembly.

Figure 2:
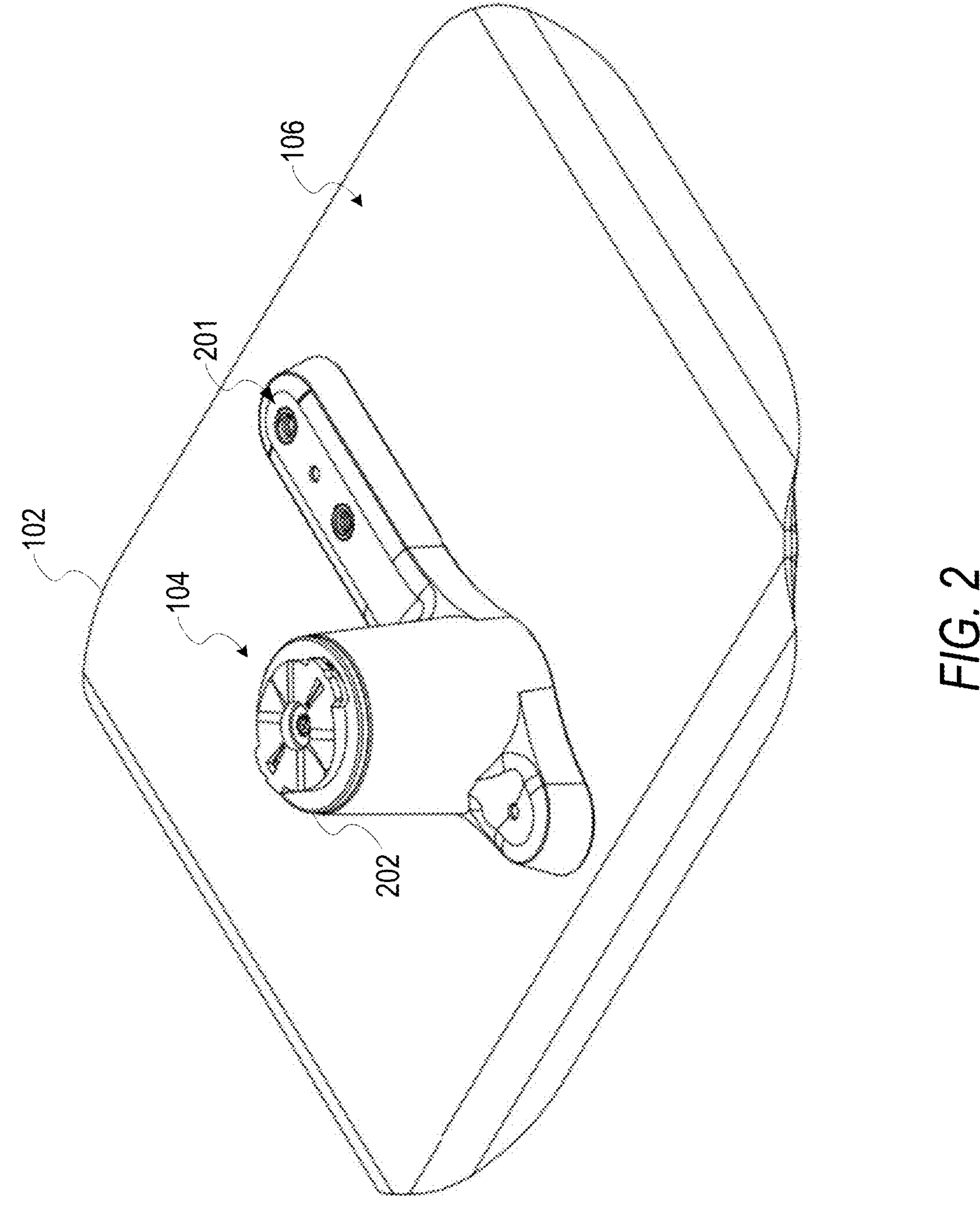
FIG. 2 includes a diagram depicting an interface element that may be affixed to a bottom side of a tray and may include one or more mounting holes to retain one or more accessories associated with an ergonomic device, according to certain embodiments.

FIG. 2 includes a diagram 200 depicting the interface element 104 that may be affixed to the bottom side 106 of the tray 102 and may include one or more mounting holes 201 to retain one or more accessories associated with the ergonomic device 101, according to certain embodiments.

Figure 5:
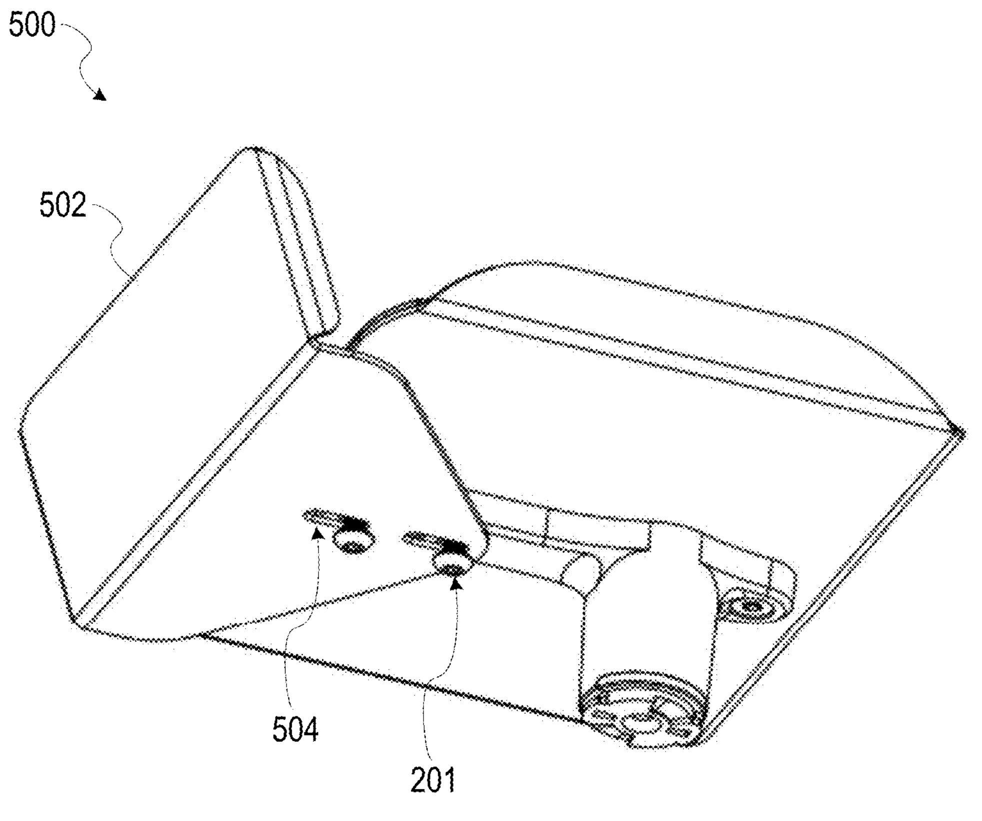
FIG. 5 provides an illustration of an accessory that may be attached to the removable tray assembly, according to certain example embodiments.
Figure 5:
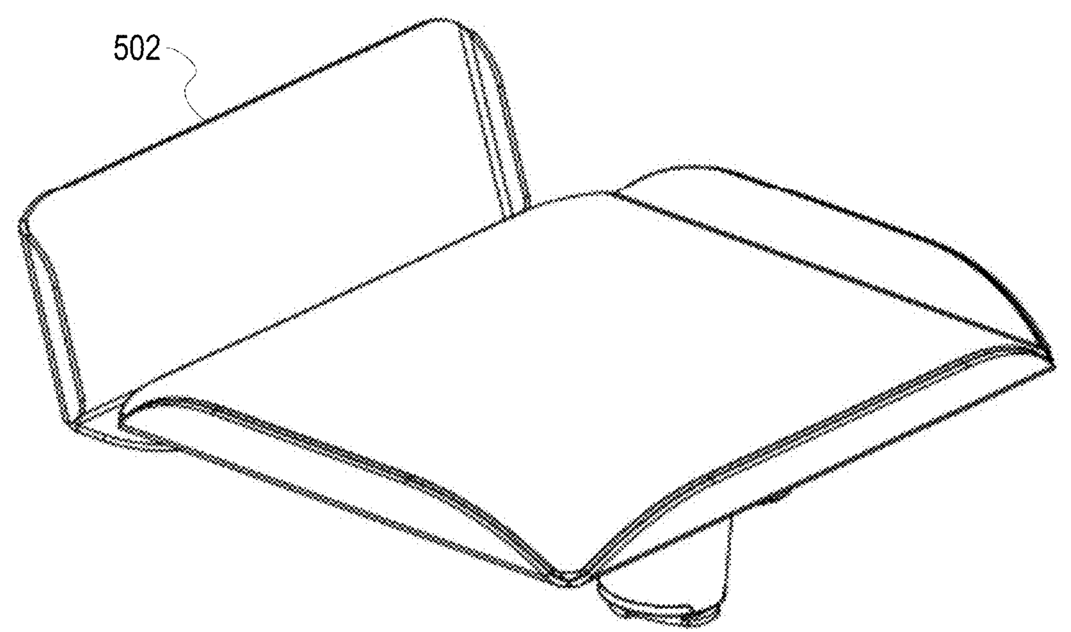

For example, in some embodiments, the one or more mounting holes 201 may align with a corresponding set of mounting holes associated with an accessory of the ergonomic device 101, such that the accessory may be mounted to the ergonomic device by the one or more mounting holes 201. An illustration of an accessory is depicted in FIG. 5 below.

As seen in the diagram 200, the interface element 104 may comprise a twist-lock mechanism 202. For example, the twist-lock mechanism 202 may include a male coupling configured to be inserted into a female coupling of a mount assembly.

Figure 3:
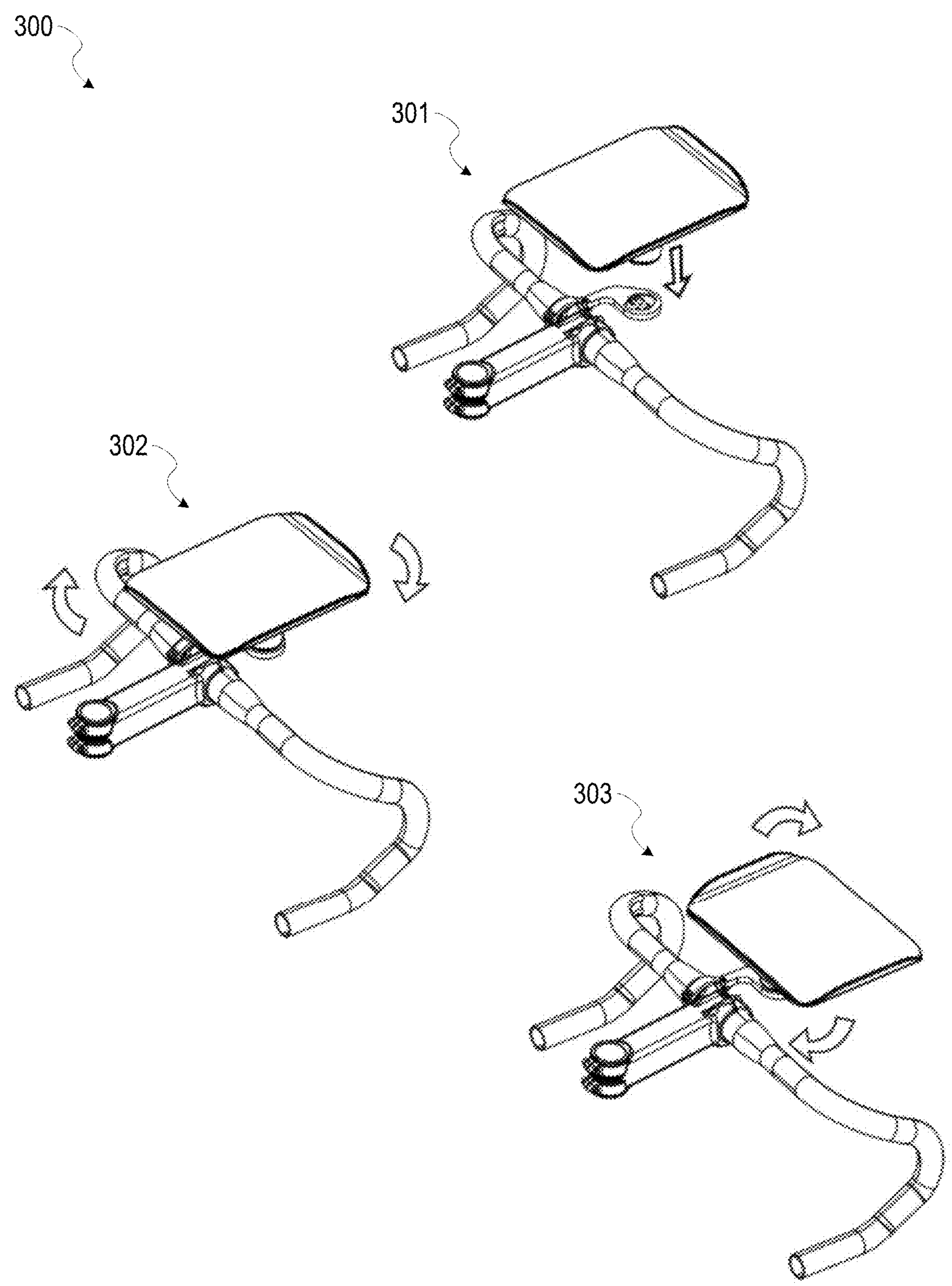
FIG. 3 provides an illustration depicting an installation procedure to apply the ergonomic device onto a mount assembly on a set of bicycle handlebars using a twist-lock, according to certain example embodiments.

FIG. 3 provides an illustration 300 depicting an installation procedure to apply the ergonomic device onto a mount assembly on a set of bicycle handlebars using a twist-lock, according to certain example embodiments.

At operation 301, a male coupling associated with the interface element of the ergonomic device may be inserted into a female coupling of a mount assembly, wherein the mount assembly is mounted upon a bicycle handlebar via a retention mechanism, such as a clamp.

At operation 302, the ergonomic device may be twisted, or rotated, causing the male coupling to lock into the female coupling of the mount assembly. For example, the ergonomic device may be rotated about an axis of the twist-lock mechanism. For example, the ergonomic device may be partially rotated about the axis in order to lock into the female coupling. In some embodiments, the ergonomic device may be rotated by 45 degrees, 90 degrees, or 180 degrees in order to lock the ergonomic device into place.

At operation 303, a user of the ergonomic device may continue to turn the ergonomic device to orient the ergonomic device as desired. Accordingly, the interface element associated with the ergonomic device may be configured to rotate 360 degrees.

Figure 4:
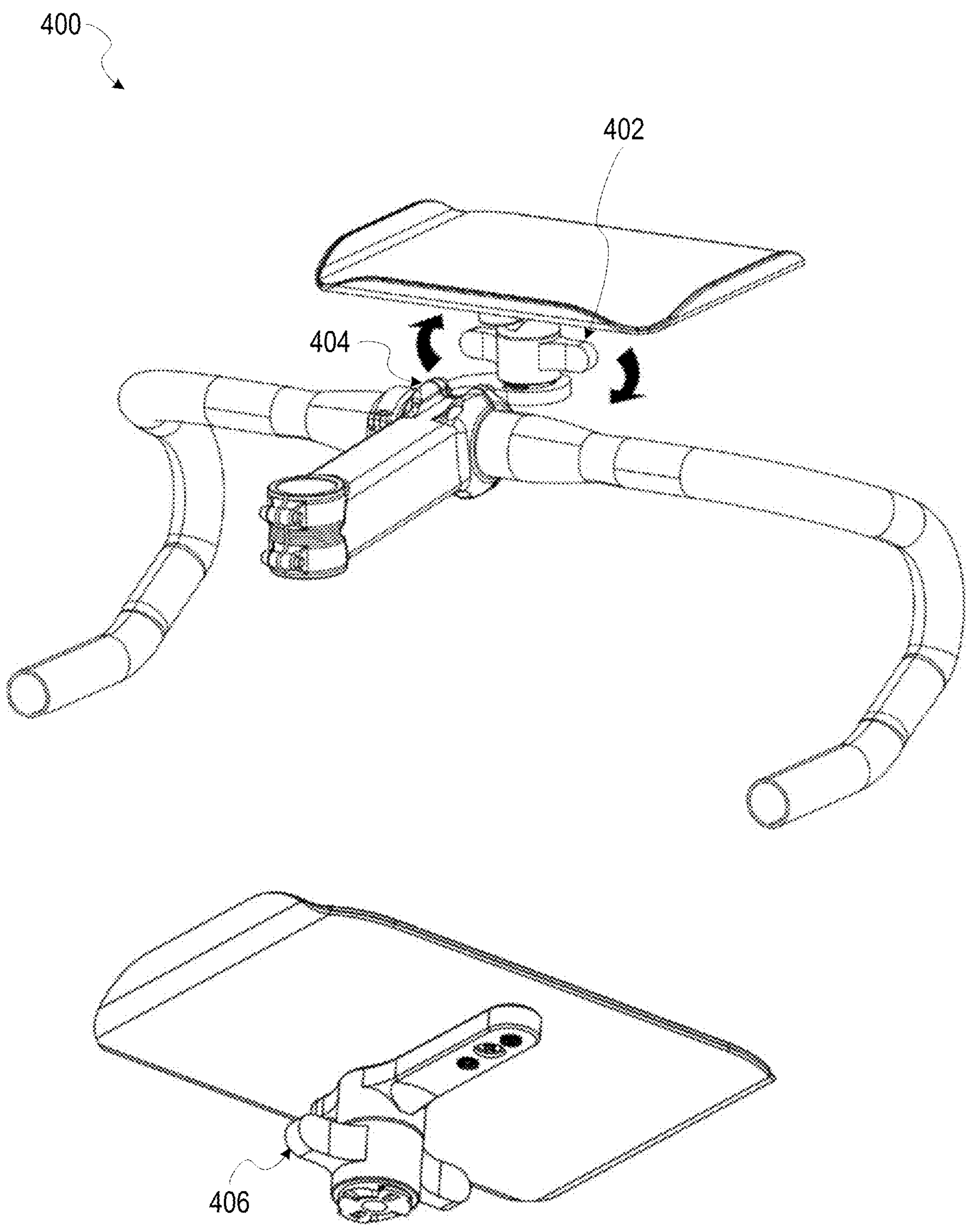
FIG. 4 provides an illustration of a riser element that may be attached to the ergonomic device, according to certain embodiments.

FIG. 4 provides an illustration 400 of a riser element 402 that may be attached to an interface element associated with the ergonomic device, such as the interface element 104 depicted in the diagram 200.

According to certain example embodiments, the riser element 402 may comprise a first end and a second end, wherein a first end of the riser element 402 comprises a female coupling configured to receive the male coupling of the interface element 104 as described in the diagram 200, and wherein the second end of the riser element 402 may comprise a male coupling to be inserted into the female coupling of the mount assembly 404.

In some embodiments, the riser element 402 may comprise a cylindrical body that includes one or more tab elements 406 protruding from the cylindrical body of the riser element 402. Accordingly, the tabs 406 may be used to twist the riser element 402 in order to lock the riser element in place, affixing the ergonomic device to the mount assembly 404.

FIG. 5 provides an illustration 500 depicting an accessory 502 that may be attached to the removable tray assembly, according to certain example embodiments. As discussed above with respect to FIG. 2, in some embodiments, the one or more mounting holes 201 of the tray 102 may align with a corresponding set of mounting holes 504 associated with the accessory 502 of the ergonomic device 101, such that the accessory 502 may be mounted to the ergonomic device 101. In some embodiments, the accessory 502 may comprise a backstop element, wherein the backstop element may be configured to retain a device, or book.

Figure 6:
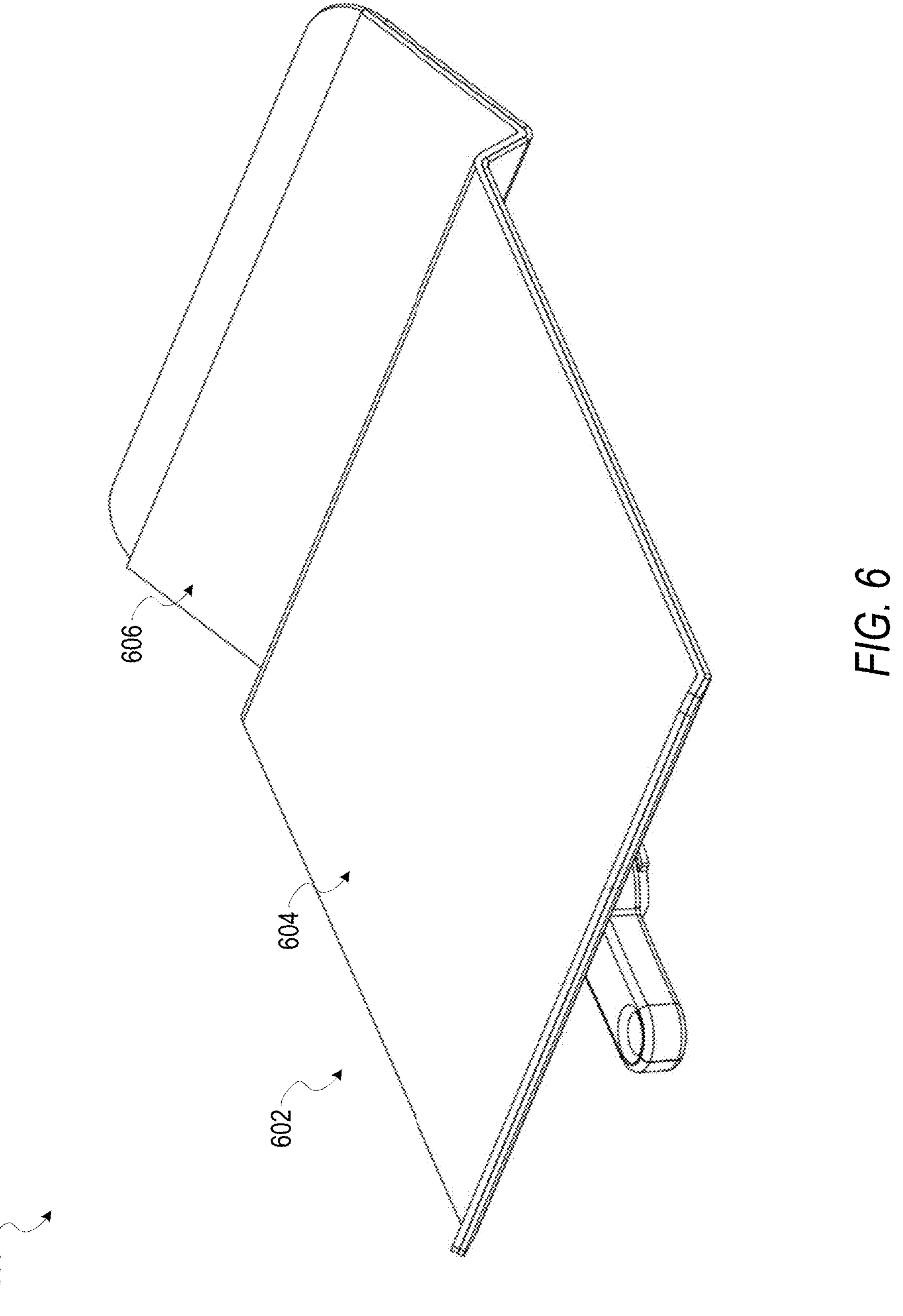
FIG. 6 provides an illustration of an embodiment of an ergonomic device that comprises a tray that includes substantially planar surface, and a retaining portion, according to certain example embodiments FIG. 7 provides an illustration of a locking element, according to certain embodiments FIG. 8 includes an illustration of an embodiment of an ergonomic device that comprises a recessed tray, according to certain embodiments.

FIG. 6 provides an illustration 600 of an embodiment of an ergonomic device 101 that comprises a tray 602 that includes substantially planar surface 604, and a retaining portion 606, according to certain example embodiments. As seen in the illustration 600, the tray 602 may be configured such that a retaining portion 606 of the tray 602 is formed by bending or molding the surface of the tray 602 to form the retaining portion 606.

Figure 7:
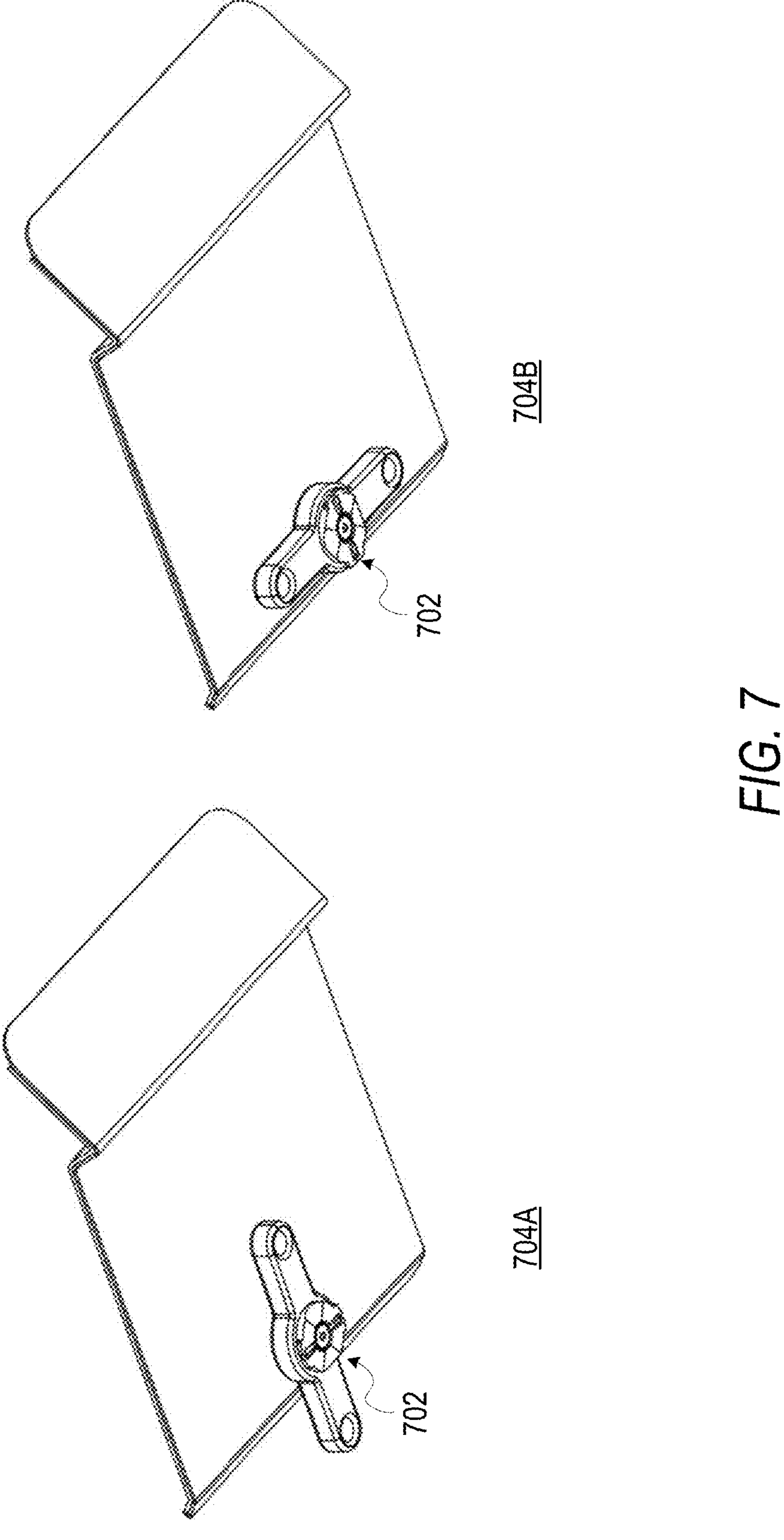

FIG. 7 provides an illustration 700 of a locking element 702, according to certain embodiments. As seen in the illustration 700, the locking element 702 may be rotated from a position depicted in the diagram 704A to the position depicted in the diagram 704B in order to lock the ergonomic device to a mount assembly, such as the mount assembly 404 depicted in the illustration 400 of FIG. 4.

Figure 8:
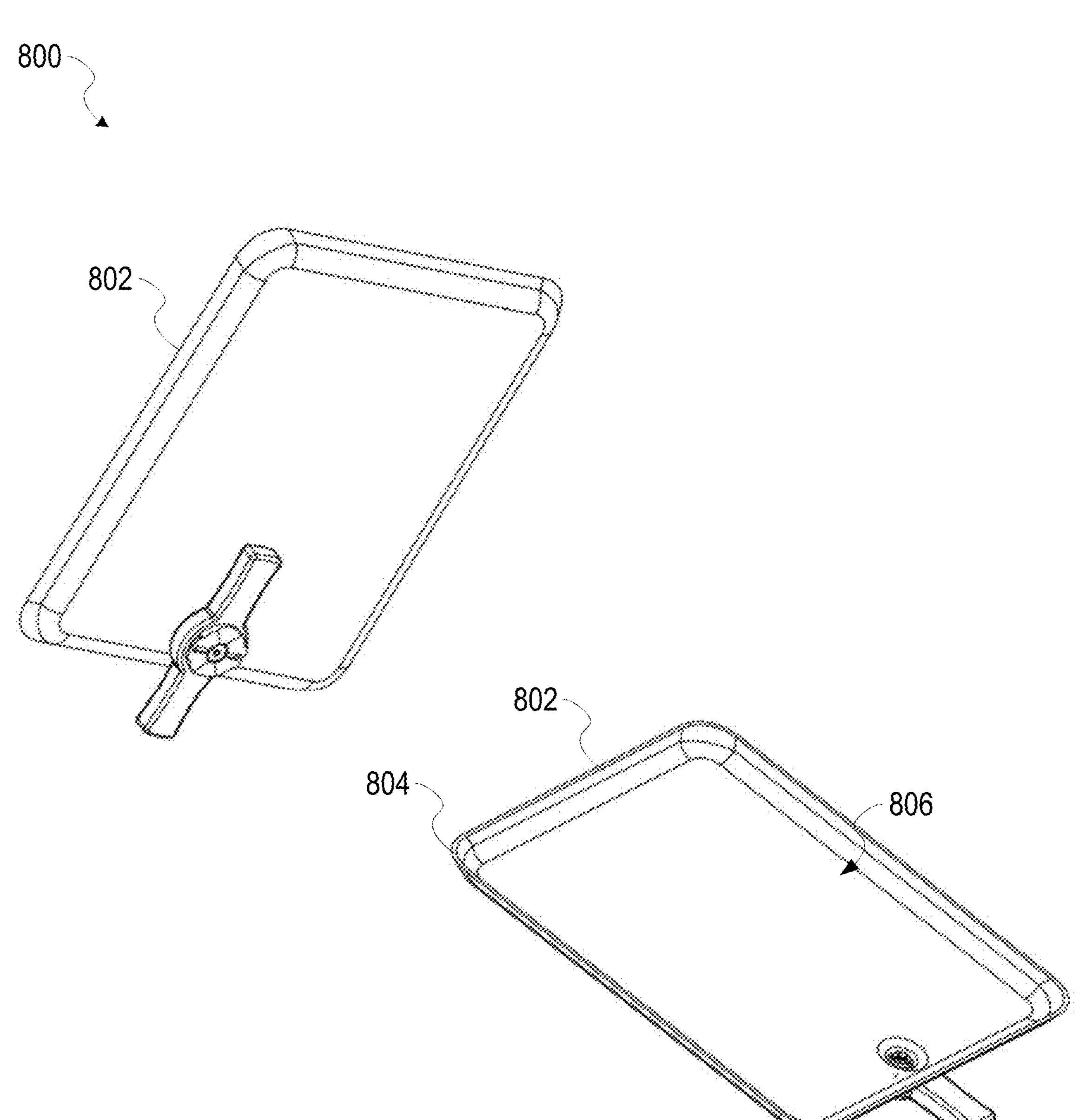

FIG. 8 provides an illustration 800 of an embodiment of an ergonomic device that comprises a recessed tray 802, according to certain embodiments.

As seen in the illustration 800, the recessed tray 802 may comprise a lip 804 around a perimeter of the recessed tray 802, and a recessed portion 806. In some embodiments, the recessed portion 806 may also comprise a textured surface, rubberized surface, non-slip coating, or pad element.

Figure 9:
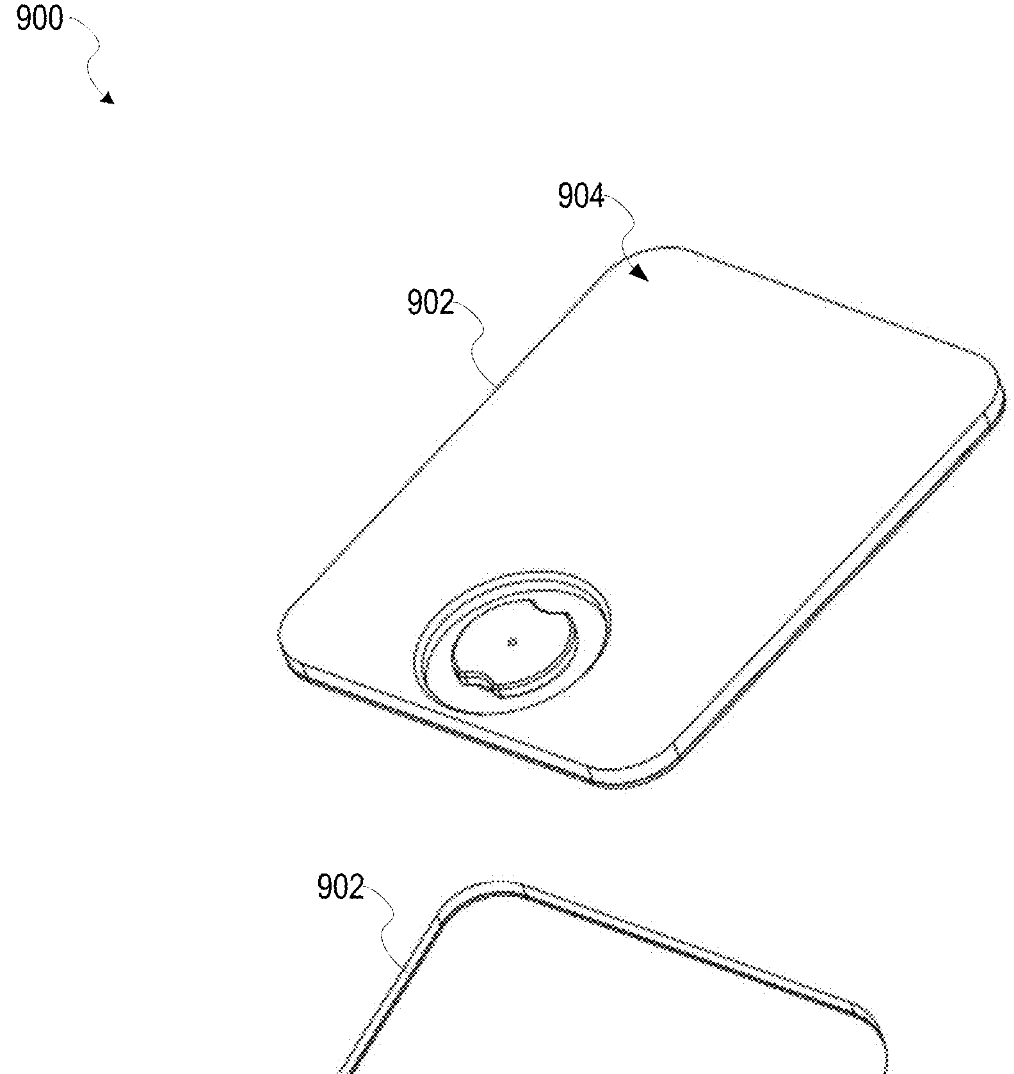
FIG. 9 provides an illustration of a substantially planar tray element of an ergonomic device, according to certain embodiments FIG. 10 provides an illustration of a rimmed tray element of an ergonomic device, according to certain embodiments.

FIG. 9 provides an illustration 900 of a substantially planar tray element 902, according to certain embodiments. As seen in the illustration 900, the substantially planar tray element 902 may comprise a top surface 904 and a bottom surface 906, wherein the bottom surface 906 may further comprise the interface element 104. In some embodiments, the substantially planar tray element 902 and interface element 104 may be molded or formed of a single piece.

Figure 10:
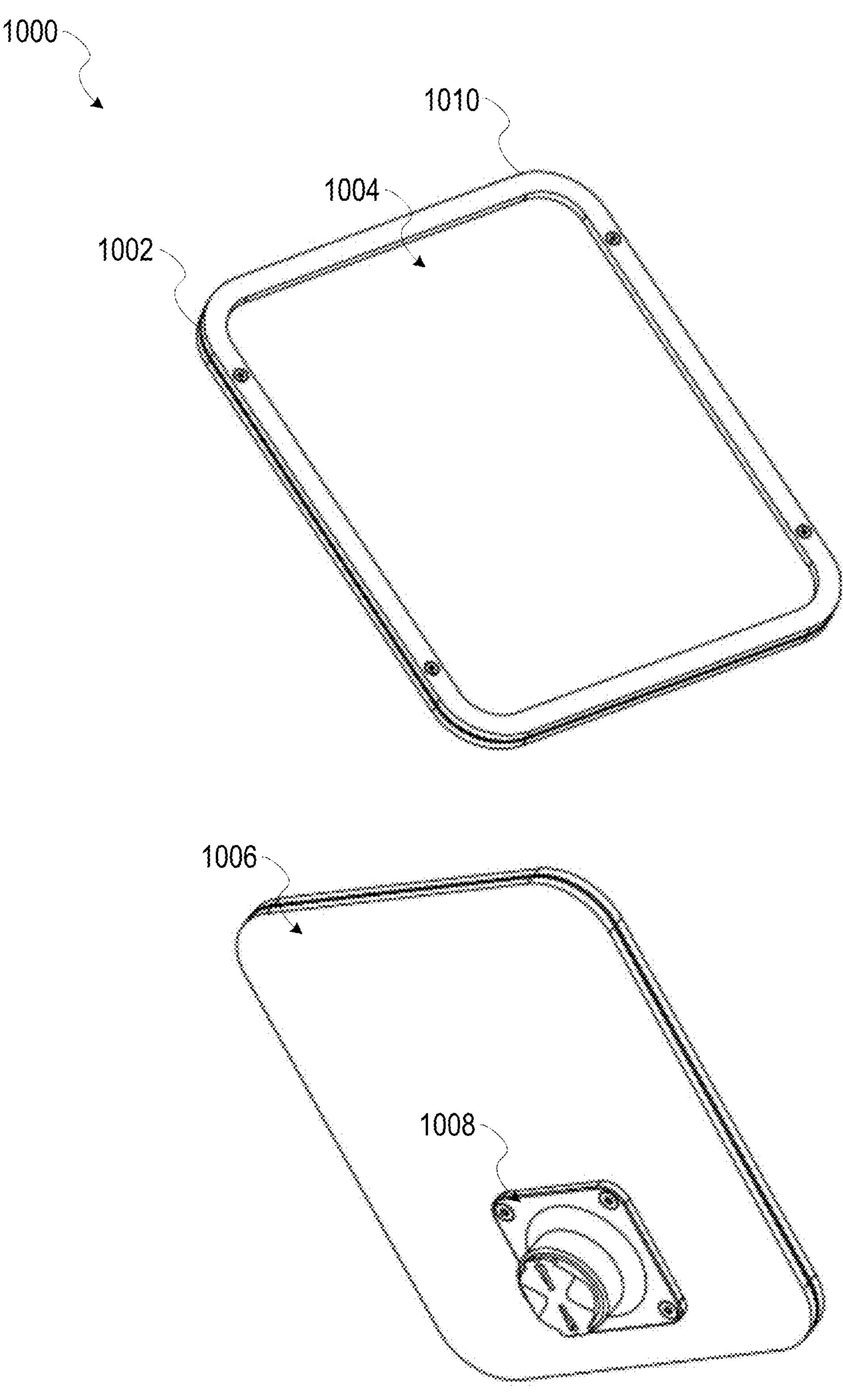

FIG. 10 provides an illustration 1000 of a rimmed tray element 1002, according to certain embodiments. As seen in the illustration 1000, a top side 1004 of the rimmed tray element 1002 may comprise a planar surface that includes provisions to attach a removable rim 1010 which may be affixed to the top side of the tray 1004. For example, the removable rim component 1010 may comprise a set of mounting holes which may align with a corresponding set of mounting holes dispersed upon the top side of the tray 1004.

A bottom side of the tray 1006 may further comprise a removable interface element 1008, which may be mounted to the bottom side of the tray 1006.

Figure 11:
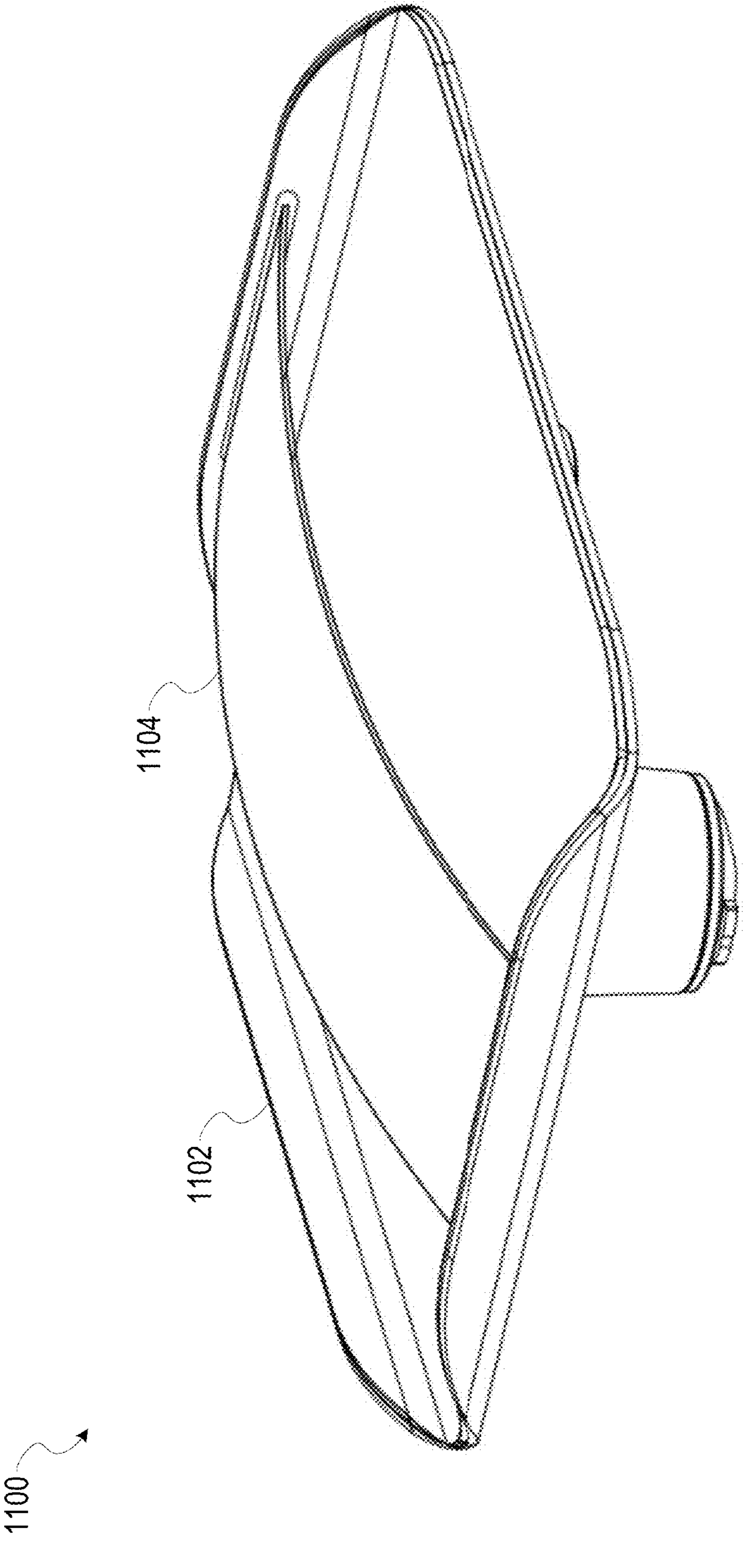
FIG. 11 provides an illustration of an accessory strap of a removable tray assembly, according to certain example embodiments.

FIG. 11 provides an illustration 1100 of an accessory strap 1104 of a removable tray assembly 1102, according to certain example embodiments. For example, the accessory stray 1104 may comprise an elastic strap element affixed upon the top side of the removable tray assembly 1102 disposed between sides of the removable tray assembly 1102. For example, the accessory strap 1104 may comprise a first end and a second end, wherein the first end and the second end are bonded to the top surface of the removable tray assembly 1102.

Figure 12:
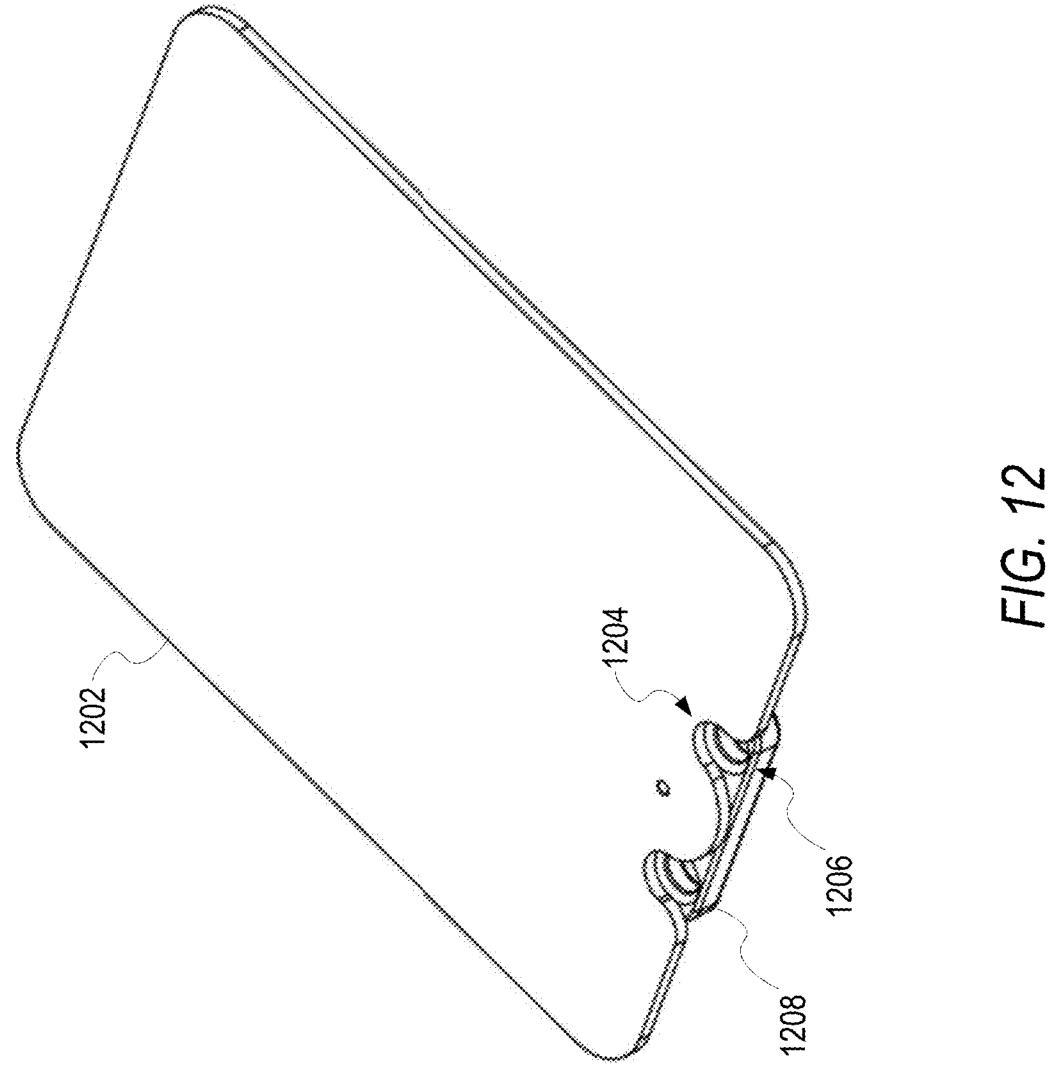
FIG. 12 provides an illustration of an embodiment of a tray assembly of an ergonomic device, according to certain example embodiments.

FIG. 12 provides an illustration 1200 of an embodiment of a tray assembly 1202 of an ergonomic device, according to certain example embodiments.

As seen in the illustration 1200, the tray assembly 1202 may include a set of pass-through 1204 that align with a set of mount holes 1206 associated with an accessory mount 1208 which may be mounted upon an interface element associated with the ergonomic device.

Figure 13:
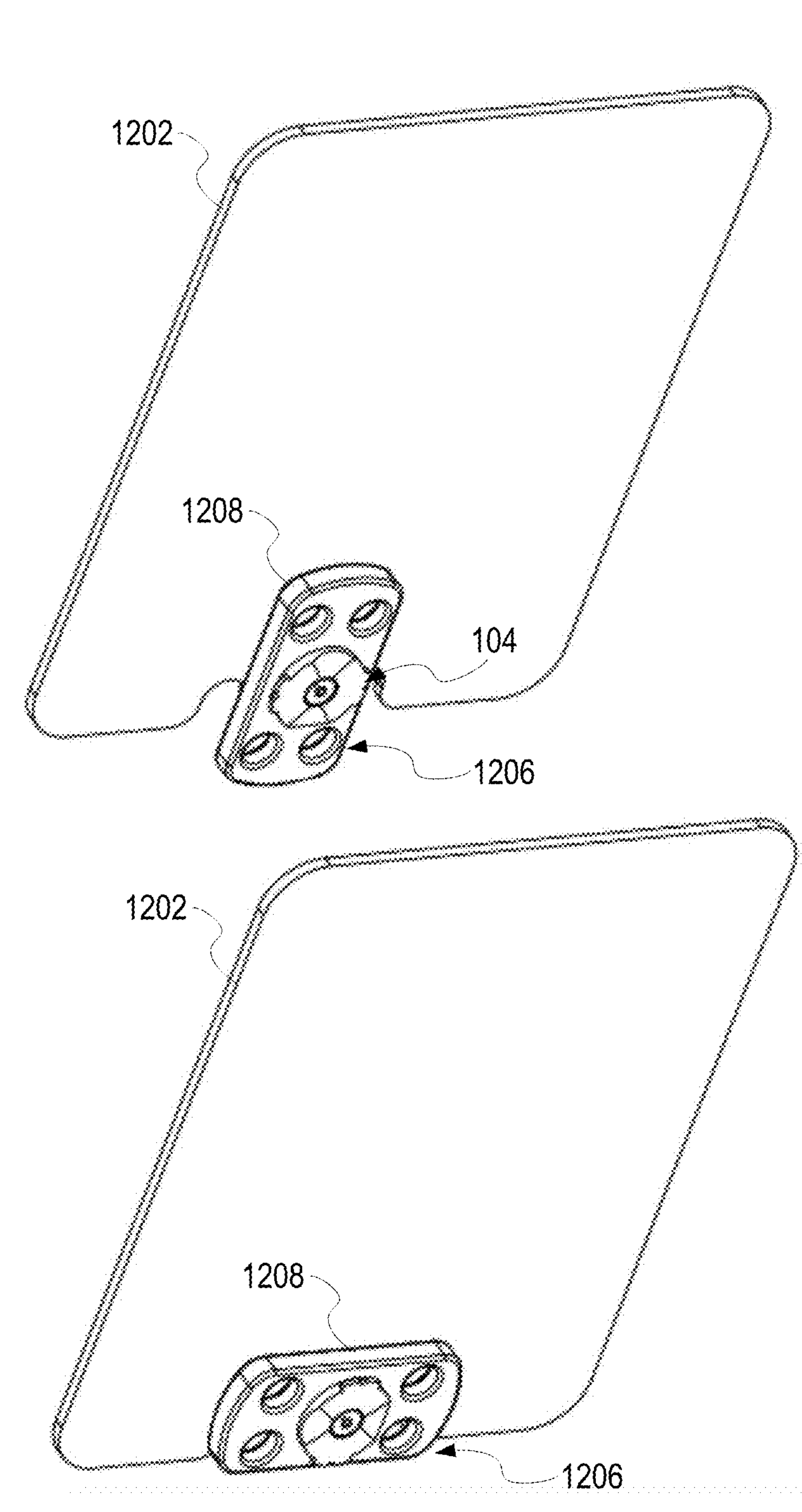
FIG. 13 provides an illustration depicting details of a tray assembly, according to certain example embodiments.

FIG. 13 provides an illustration 1300 depicting details of the tray assembly 1202 presented in FIG. 1200. As seen in the illustration 1300, an accessory mount 1208 may be rotatably mounted upon an interface element 104, such that a user of the ergonomic device may twist the accessory mount 1208 such that it spins around the interface element 104.

In some embodiments, the accessory mount may comprise a plurality of mounting holes 1206, wherein the plurality of mounting holes 1206 may comprise a first pair of mounting holes that correspond with a first diameter, and a second pair of mounting holes that corresponds with a second diameter. Accordingly, a user of the ergonomic device may twist the accessory mount 1208 in order to configure the accessory mount based on a corresponding set of mounting holes associated with an accessory to be mounted upon the ergonomic device.

Figure 14:
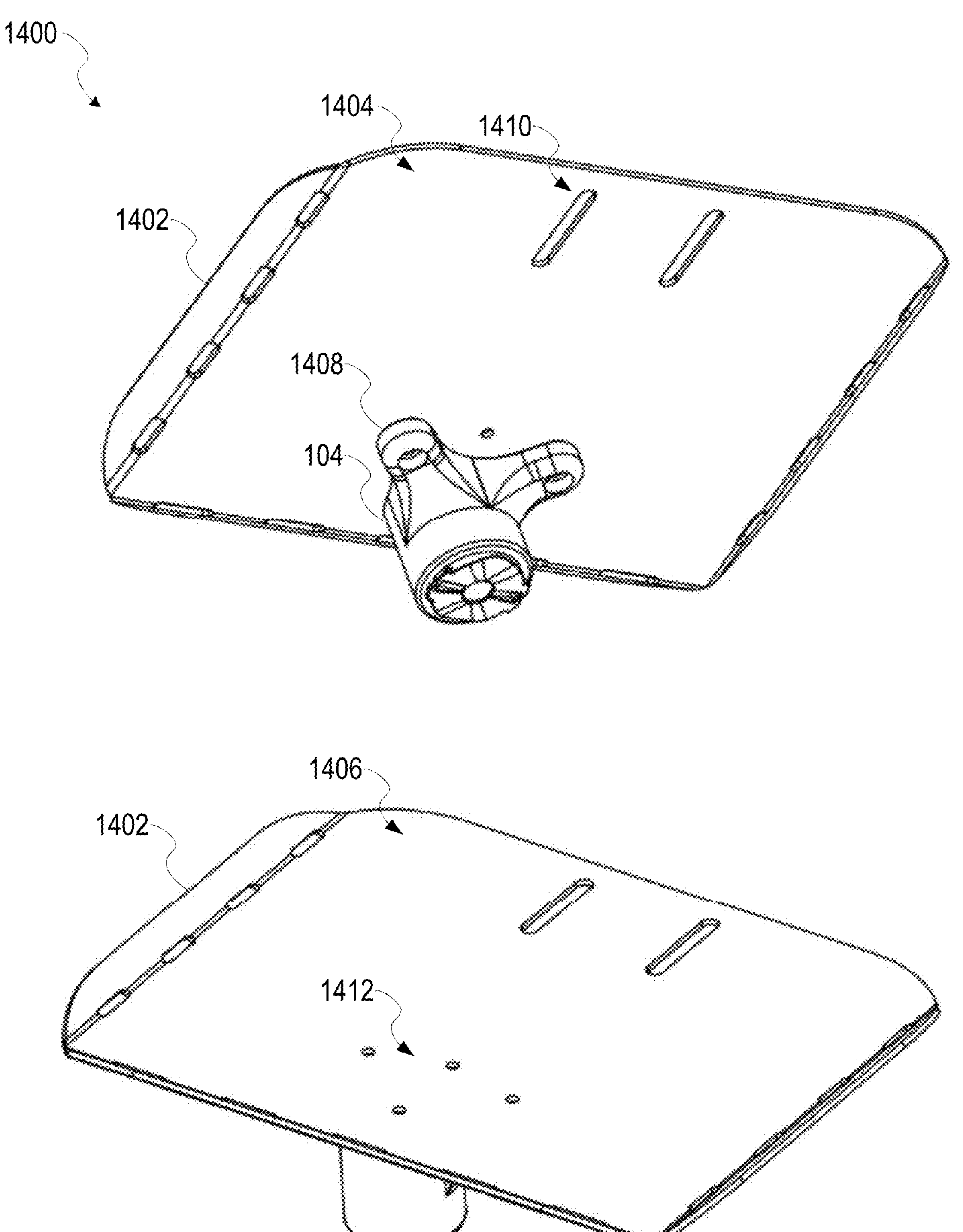
FIG. 14 provides an illustration of a tray element associated with an ergonomic device, according to certain embodiments.

FIG. 14 provides an illustration 1400 of a tray element 1402 of an ergonomic device, according to certain example embodiments.

As seen in the illustration 1400, the tray element 1402 may comprise a top surface 1406, a bottom surface 1404, and a plurality of surface holes 1410. In some embodiments, the interface element 104 may comprise a set of mounting tabs 1408 which may align with a corresponding set of mount holes 1412 associated with the tray element 1402.

Figure 15:
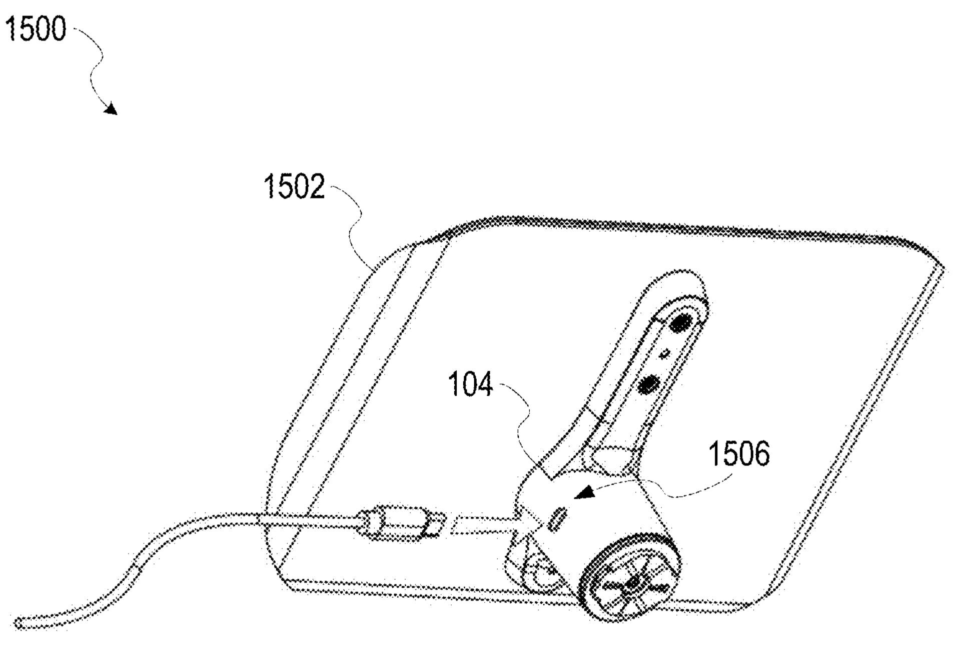
FIG. 15 provides an illustration of a tray element that includes an inductive charging plate, according to certain embodiments.
Figure 15:
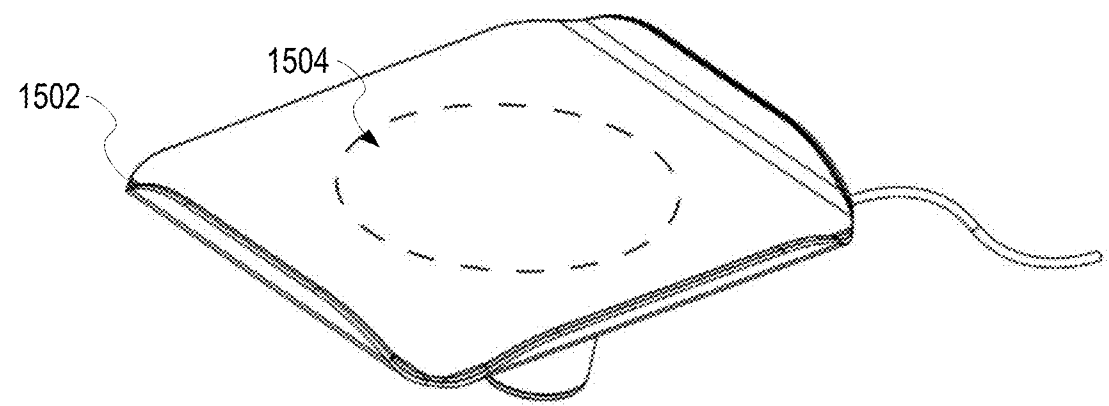

FIG. 15 provides an illustration 1500 of a tray element 1502 that includes an inductive charging plate 1504, according to certain embodiments.

As seen in the illustration 1500, the inductive charging plate 1504 may be mounted upon a bottom side of the tray element 1502, such that a device, such as a mobile device, placed upon the top side of the tray element 1502 may be charged using the inductive charging plate 1504. In some embodiments, the inductive charging plate 1504 may be integrated into the interface element 104 of the ergonomic device, wherein the interface element 104 is affixed to the bottom side of the tray element 1502, thereby providing an inductive surface to the ergonomic device. In some embodiments, the interface element 104 may further comprise a provision 1506 to receive a charging cable to provide power to the inductive charging plate 1504.

Figure 16:
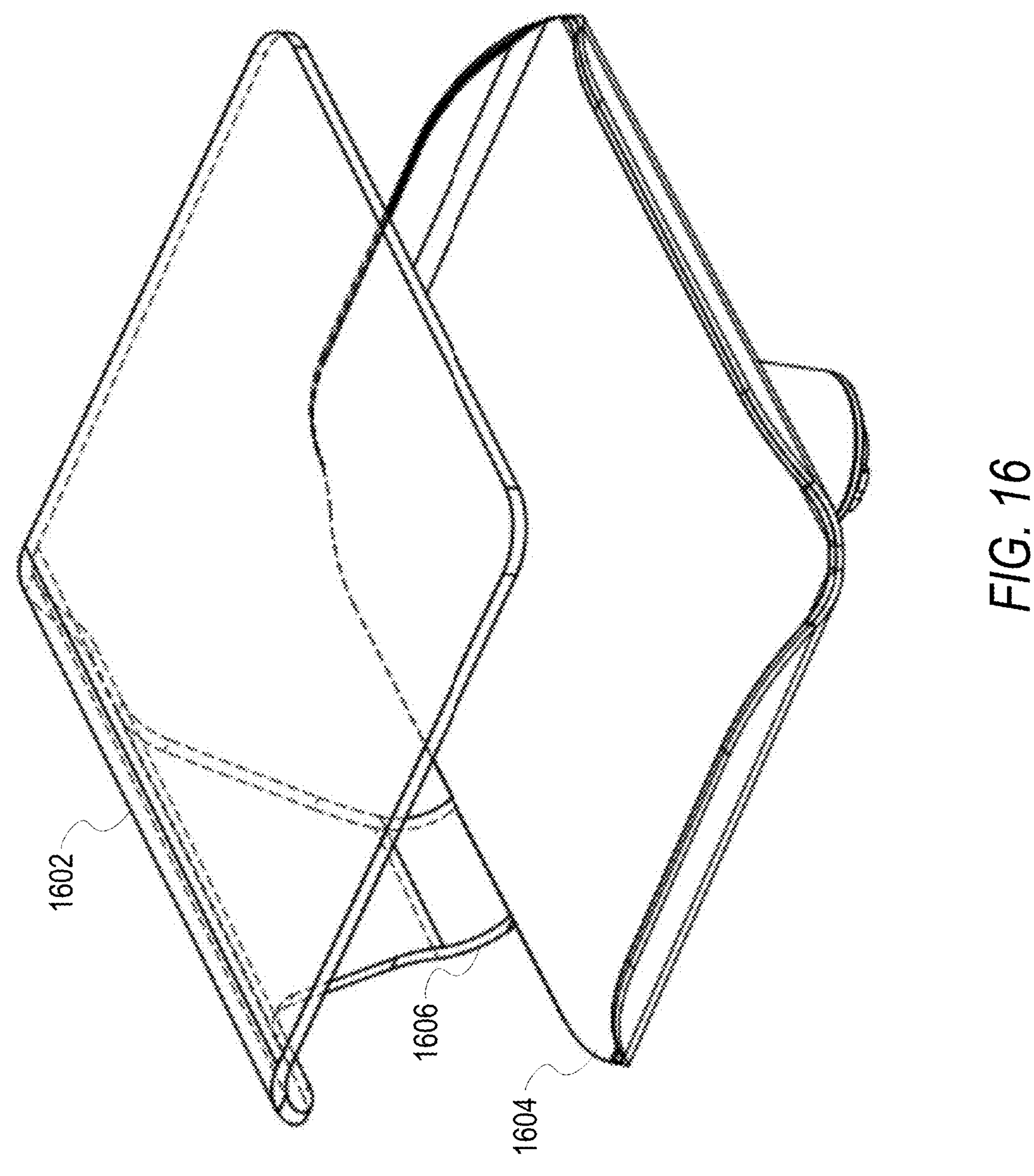
FIG. 16 provides an illustration depicting a sweat guard which may be affixed to a tray of the ergonomic device, according to certain example embodiments.

FIG. 16 provides an illustration 1600 depicting a sweat guard 1602 which may be affixed to a tray 1604 of the ergonomic device, according to certain example embodiments.

As seen in the illustration 1600, the sweat guard 1602 may be formed of a transparent material, and may be affixed to the tray element 1604 by a mounting arm 1606, which may mount to a bottom surface of the tray element 1604.

What is claimed is:

1. An ergonomic device comprising:

a tray that comprises a top side, a bottom side, a front side, a rear side, a left side, and a right side, the top side of the tray comprising a reverse crowned surface, wherein one or more of the front side, the left side, and the right side are integrally upturned relative to a central portion of the top side to form the reverse crowned surface;

an inductive charging plate;

a mount assembly configured to attach to a handlebar of a bicycle; and an interface element affixed to the bottom side of the tray, the interface element comprising a protrusion that includes a male coupling configured to be inserted into a female coupling of the mount assemble and rotated to lock the tray to the mount assembly via the locking mechanism.

2. The ergonomic device of claim 1, wherein the inductive charging plate is affixed to the bottom side of the tray.

3. The ergonomic device of claim 1, wherein the inductive charging plate is integrated within the interface element.

4. The ergonomic device of claim 1, wherein one or more of the front side, the left side, and the right side are upturned to form the reverse crowned surface.

5. The ergonomic device of claim 1, wherein the reverse crowned surface is formed of a removable rim component affixed to the top side of the tray.

6. The ergonomic device of claim 1, wherein the locking mechanism includes a quarter turn locking mechanism.

7. The ergonomic device of claim 1, wherein the interface element is formed of a cylindrical structure that includes one or more tab elements.

8. The ergonomic device of claim 1, wherein the interface element is affixed upon the bottom side of the tray.

9. The ergonomic device of claim 1, further comprising an elastic strap element affixed above the top side of the tray and disposed between the left side and the right side of the tray.

10. The ergonomic device of claim 9, wherein the elastic strap element is bonded to the top surface of the tray.

11. The ergonomic device of claim 1, wherein the mount assembly comprises a first end and a second end, and wherein the first end is configured to attach to the interface element of the tray, and the second end comprises a retention element to attach the mount assembly to the handlebar of the bicycle.

12. The ergonomic device of claim 11, wherein the retention element comprises a clamping mechanism.

13. The ergonomic device of claim 1, further comprising a riser structure that comprises a first end and a second end, the first end configured to attach to the interface element of the tray, and the second end configured to attach to the mount assembly.

14. The ergonomic device of claim 1, further comprising a foam pad applied upon the top side of the tray.

15. The ergonomic device of claim 1, further comprising a backstop element mounted proximate to the rear side of the tray and extending upwards to form a backboard.

16. The ergonomic device of claim 15, wherein the backstop element comprises a mounting tab that comprises a series of mounting holes that align with a corresponding set of mounting holes dispersed along the bottom side of the tray.

17. The ergonomic device of claim 1, wherein the interface element comprises an interface to receive a charging cable to supply power to the inductive charging plate.

18. The ergonomic device of claim 1, wherein the interface element comprises a rotatable mount that enables rotation of the ergonomic device when installed on the mount assembly.

19. The ergonomic device of claim 1, wherein the top side of the tray comprises a planar surface that includes provisions to attach a removable rim.

20. The ergonomic device of claim 1, wherein the interface element is affixed to the bottom side of the tray by one or more mounting pins, and further comprises a protrusion configured to lock into a coupling of the mount assembly.

* * * * *